(12) United States Patent
Byun et al.

(10) Patent No.: US 8,507,127 B2
(45) Date of Patent: Aug. 13, 2013

(54) RECHARGEABLE BATTERY

(75) Inventors: Jeongdeok Byun, Yongin-si (KR);
Kyungho Park, Yongin-shi (KR); Seok Koh, Yongin-si (KR); Eunok Kwak, Yongin-si (KR); Kyungwon Seo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 981 days.

(21) Appl. No.: 12/007,792

(22) Filed: Jan. 15, 2008

(65) Prior Publication Data
US 2008/0176131 A1 Jul. 24, 2008

(30) Foreign Application Priority Data

Jan. 18, 2007 (KR) .................. 10-2007-0005778

(51) Int. Cl.
*H01M 14/00* (2006.01)
*H01M 2/00* (2006.01)
*H01M 2/08* (2006.01)
*H01M 2/02* (2006.01)

(52) U.S. Cl.
USPC ............ 429/163; 429/7; 429/175; 429/178

(58) Field of Classification Search
None
See application file for complete search history.

(56) References Cited

U.S. PATENT DOCUMENTS

| 2004/0146775 A1* | 7/2004 | Yoshizawa et al. ............. 429/61 |
| 2005/0153172 A1* | 7/2005 | Han ................................. 429/7 |
| 2006/0024573 A1* | 2/2006 | Yim et al. ...................... 429/174 |

FOREIGN PATENT DOCUMENTS

| CN | 1512609 A | 7/2004 |
| CN | 1643710 A | 7/2005 |
| CN | 1722507 A | 1/2006 |
| CN | 1783570 A | 6/2006 |
| CN | 1870342 A | 11/2006 |
| JP | 2003-272604 | 9/2003 |
| JP | 2005-175414 | 6/2005 |

\* cited by examiner

*Primary Examiner* — Melvin C Mayes
*Assistant Examiner* — Sheng H Davis
(74) *Attorney, Agent, or Firm* — Robert E. Bushnell, Esq.

(57) ABSTRACT

The present invention relates to a rechargeable battery, particularly a rechargeable battery having a bare cell, a protective circuit board, a lead plate, and a flat plate attached to a cap plate of the bare cell for connecting the lead plate to the cap plate. According to the invention, the lead plate is not directly combined with the cap plate, in which the cap plate is made of material differently from the lead plate, and the lead plate and cap plate are respectively welded to the metal layer made of the same material by means of the flat plate formed of metal, thereby allowing them to be easily combined with each other and the adhesive force to be enhanced.

19 Claims, 6 Drawing Sheets

RECHARGEABLE BATTERY

CLAIM OF PRIORITY

This application makes reference to, incorporates the same herein, and claims all benefits accruing under 35 U.S.C. §119 from an application for RECHARGEABLE BATTERY earlier filed in the Korean Intellectual Property Office on the 18th of Jan. 2007 and there duly assigned Serial No. 10-2007-0005778.

BACKGROUND OF THE INVENTION

1. Field of the Invention

The present invention relates to a rechargeable battery, and more particularly, to a rechargeable battery in which a bare cell can be easily combined with a protective circuit board and the adhesive force between them has been strengthened.

2. Description of the Related Art

Generally, a rechargeable battery can be used repeatedly if it is charged, differently from a disposable battery. The rechargeable battery has been used mainly as a power source of electronic device for communication, for information processing, and for multimedia. Since a rechargeable battery is a power source having ultra-light weight, high energy density, high output voltage, low self-electric discharge rate, environmental friendly property and long lifetime, it has recently attracted interest, and rapidly developed.

The rechargeable battery is divided into nickel-metal hybride (Ni-MH) battery and lithium-ion (Li-ion) battery according to electrode active material and particularly, the lithium-ion battery can be divided into two types according to electrolyte: one using a liquid electrolyte and the other using a solid polymer electrolyte or a gel state electrolyte. Further, the lithium-ion battery is divided into various types such as a can type and a pouch type according to shape of a container receiving an electrode assembly.

The lithium-ion battery has much higher energy density per weight than the disposable battery, so as to realize the ultra-light battery, and an average voltage per cell is 3.6V which is equal to three times of an average voltage of Ni—Cd battery, nickel-metal hydrogen battery, and any other rechargeable battery. In addition, the lithium-ion battery has a self electric discharge rate less than about 5% at 20° C. which is about ⅓ of the rate of Ni—Cd battery or Ni-MH battery, and is environmentally friendly because lithium-ion battery do not use a heavy metal such as Cd or Hg, and further has a merit to charge/discharge more than 1,000 times in steady state. Therefore, the development has rapidly been accomplished with progress of recent information and communication technology.

The lithium-ion battery is formed by receiving an electrode assembly composed of an anode plate, cathode plate and separator, which are laminated and wound. The electrode assembly is stored inside a can formed in aluminum or aluminum alloy, and an electrolytic solution is filled inside the can, and the upper opening of the can is tightly sealed with a cap assembly.

The reason that the can is formed with aluminum or aluminum alloy is because the aluminum is lighter than other conductive metals, and it is possible to reduce the weight of the battery, and the aluminum was not corroded even when used for long time under high voltage. Such a lithium-ion battery usually has one electrode terminal which is electrically disconnected from the can, and another electrode terminal which is connected to the can. Therefore, the can of the battery itself becomes one of the electrode terminals.

On the other hand, the lithium-ion battery is exposed to risk to be exploded by a sudden increase of the voltage in the case of an external short-circuit or an internal short-circuit by a mechanical impact or an over-charge/over-discharge. To avoid such a danger, the lithium ion battery is normally received inside the battery pack with connected electrically to the safety device such as a positive temperature coefficient (PTC) element, thermal fuse and protecting circuit module. The safety devices are coupled to the anode terminal or the cathode terminal of the bare cell by a conductor structure called as a lead plate, and prevent the battery from breakdowns by breaking an electric current, when the battery temperature reaches a high level or the battery voltage is suddenly increased by over-charge or over-discharge, so as to prevent the battery from breakdowns.

On the other hand, the battery pack is divided into two types, a hard pack battery and an inner pack battery according to an external shape. The hard pack battery is a type that a plastic resin housing is integrally molded on the outside the battery in the state that the external terminal connected electrically to an external device is exposed. The inner pack battery is a type that a plastic resin housing is not separately molded on the outside the battery in the state that the external terminal is exposed. At least one part of the outside housing being exposed is generally composed of the same material as the housing of external device because a part of the outside the hard pack battery is exposed in the state that it is mounted on an external device. Therefore, there is a merit to mount easily the hard pack battery on external device, but the housing of the battery has a problem that it must be produced suitable for the shape and structure of the external device. On the other hand, because an extra decoration case is attached in the state that the inner pack battery was mounted in external device, there is a troublesome point of loading compared with the hard pack battery, but there is a good merit that can be used regardless of a shape and a structure of external device. Therefore, the development of the inner pack battery, which can be employed regardless of a shape and a structure of outside device, has been rapidly continued.

The bare cell forms an anode terminal and a cathode terminal on the side opposed to the protective circuit board. The anode terminal is a cap plate itself formed of aluminum or aluminum alloy and the cathode terminal is a terminal protruded like as a projection on the cap plate and electrically disconnected to the cap plate by means of a insulating gasket intervened on the circumference.

The protective circuit board forms a circuit on a panel made of resin and an external terminal on an outside surface. A circuit part is formed on a back side where the external terminal is formed on the protective circuit board, i.e., on the inside surface. In addition, the lead plate is located between the bare cell and the protective circuit board.

The lead plate includes an anode lead plate and a cathode lead plate, and one side of a conventional anode lead plate is coupled to the protective circuit board and the other side is coupled to the cap plate. The anode lead plate is formed of nickel or nickel alloy, and the cap plate is formed of aluminum or aluminum alloy. Therefore, it is not easy to weld the anode lead plate to the cap plate. In other words, because the combination of the anode lead plate with the cap plate is to weld metals each formed of different materials, the efficiency of the combination becomes lower and the adhesive force also becomes weaker and particularly as for aluminum, the resistance is small and there is the problem that a resistance welding method cannot be used.

Further, referring to FIG. 6, the lead plate 300 has a problem that a distance spaced between the bare cell 100 and the protective circuit board (not shown) has been increased due to its own length. Therefore, there is the problem that the longitudinal size of the battery is increased, resulting in reduction of the capacity per volume of the battery.

SUMMARY OF THE INVENTION

Therefore, an object of the invention is to provide a rechargeable battery that can easily combine a lead plate with a cap plate and strengthen the adhesive force between the lead plate and the cap plate by increasing the welding efficiency of the lead plate and the cap plate.

Another object of the invention is to provide a rechargeable battery that can improve the capacity per volume by decreasing the distance spaced between a protective circuit board and a bare cell.

Additional advantages, objects and features of the invention will be set forth in part in the description which follows and in part will become apparent to those having ordinary skill in the art upon examination of the following or may be learned from practice of the invention.

According to an aspect of the present invention, there is provided a rechargeable battery, which comprises: a bare cell, a protective circuit board, a lead plate electrically connecting the bare cell to the protective circuit board, and a flat plate, which is attached to the cap plate of the bare cell, and combining the lead plate with the cap plate.

The flat plate may be formed of two or more metal layers. The flat plate may include an upper metal layer formed of a nickel metal layer coupled to the lead plate and a lower metal layer formed of aluminum metal layer coupled to the cap plate.

The bare cell and the protective layer may be located in parallel to each other by the lead plate. The lead plate may have an inside bending part and may be bent about a center axis of the inside bending part at 180 degrees.

The lead plate may include an anode lead plate whose one side is welded to the protective circuit board and the other side is welded to the upper metal layer of the flat plate, and a cathode lead plate whose one side is welded to the protective circuit board and the other side is welded to an electrode terminal of the bare cell.

The combining case may have a sleeve surface at a lower part thereof so as to be coupled to an upper end of the bare cell in sleeve type. The combining case may be formed of an injection molded case having a space inside thereof. The combining case may form an external terminal hole to expose an external terminal of the protective circuit board outside the combining case. The sleeve surface of the combining case may be bonded to the bare cell. A circumferential surface of the rechargeable battery, in which the combining case and the bare cell are combined with each other, may be taped.

The rechargeable battery may further include a safety device having one side coupled to the electrode terminal of the bare cell and the other side coupled to the lead plate. The safety device may be formed of a positive temperature coefficient (PTC) element.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
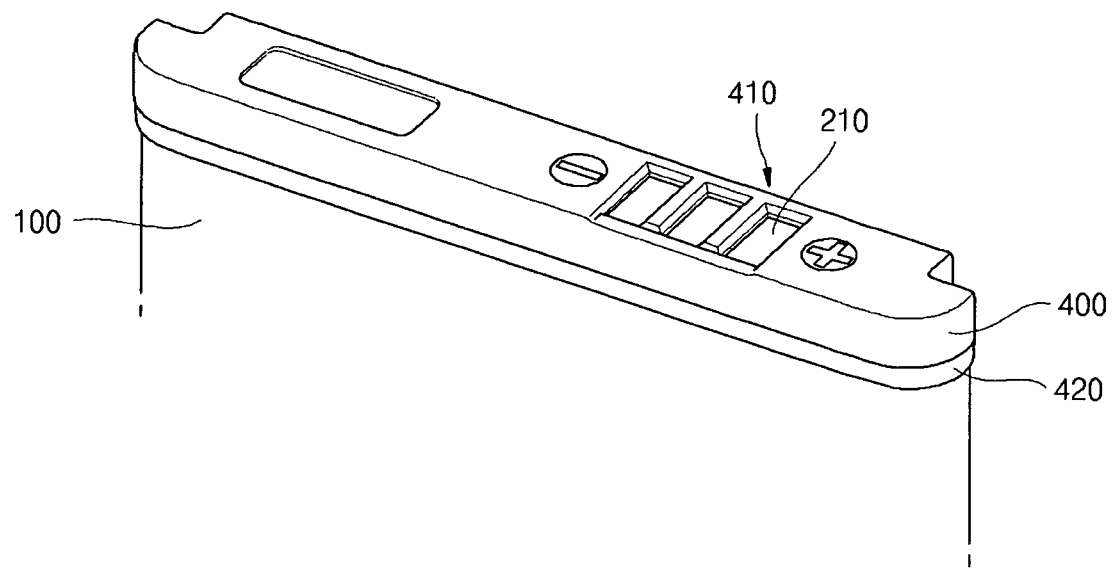
FIG. 1 is a partial perspective diagram illustrating a rechargeable battery of one embodiment of the present invention.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
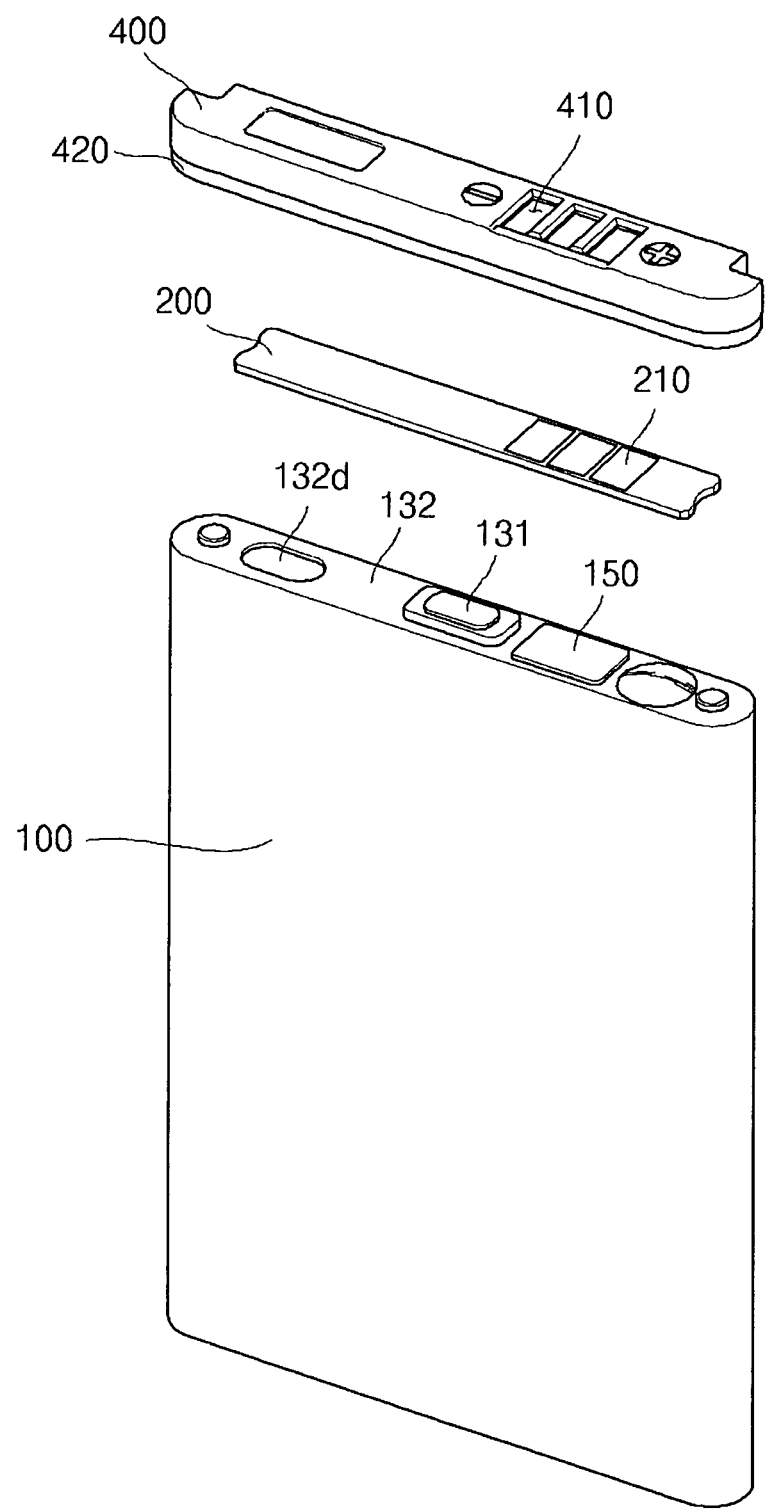
FIG. 2 is an exploded perspective diagram illustrating a rechargeable battery of one embodiment of the present invention.

Referring to FIGS. 1 and 2, a rechargeable battery includes a bare cell 100, a protective circuit board 200 electrically connected to the bare cell 100, a lead plate (not shown) to electrically connect the bare cell 100 to the protective circuit board 200, and a combining case 400 to cover the upper end of the bare cell 100 and the protective circuit board 200 and the lead plate (not shown).

Figure 5:
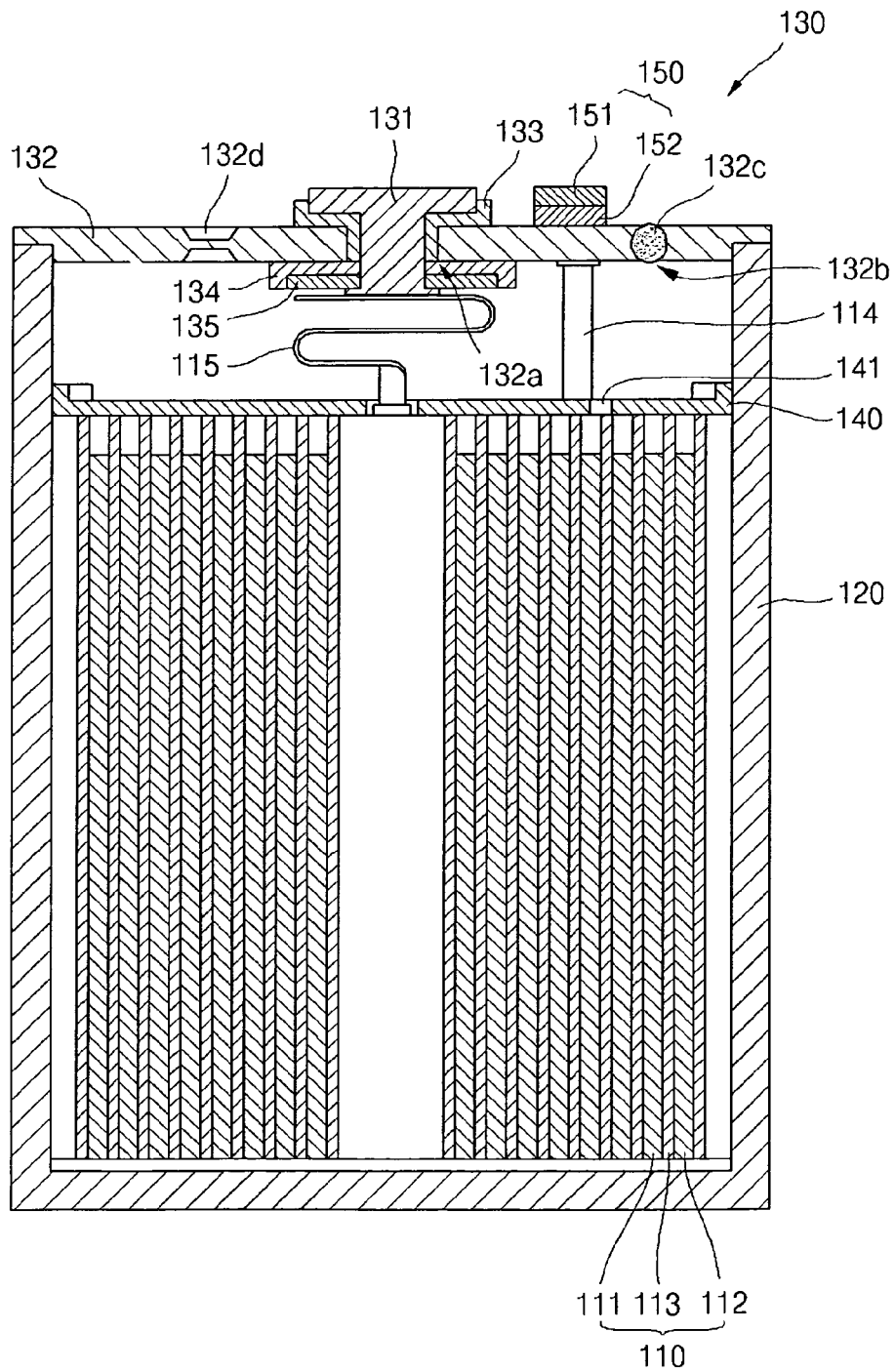
FIG. 5 is a sectional diagram illustrating the bare cell of one embodiment of the present invention.
Figure 6:
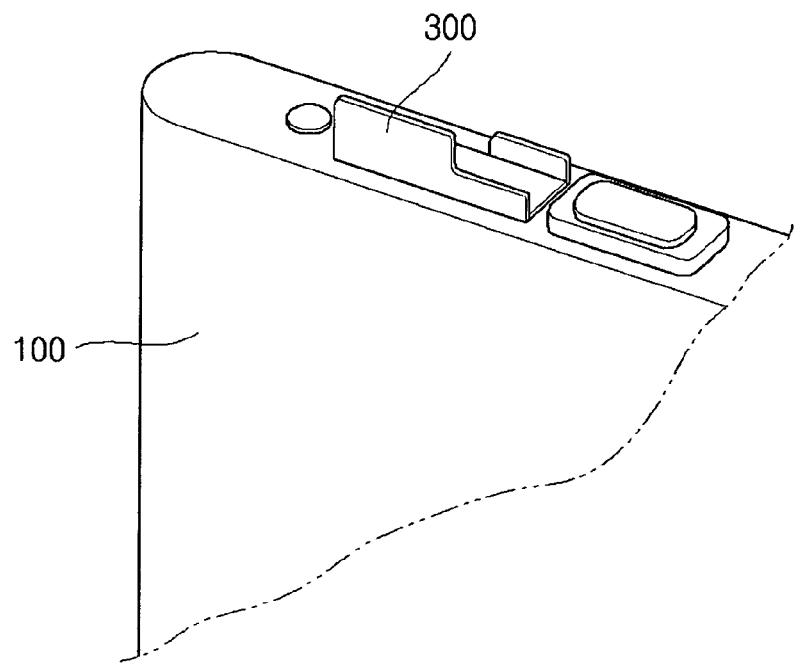
FIG. 6 is a partial expanded perspective diagram illustrating a rechargeable battery connected with a lead plate.

Referring to FIG. 5, the bare cell 100 includes an electrode assembly 110, a can 120 receiving the electrode assembly 110 and a cap assembly 130 tightly sealing the upper opening of the can 120. The electrode assembly 110 is formed by laminating and winding an anode plate 111 coated with anode active material, a cathode plate 112 coated with cathode active material, and a separator 113 interposed between the anode plate 111 and the cathode plate 112.

An anode tab 114 is electrically connected to an anode collector of the anode plate 111 that is not coated with the anode active material, and a cathode tab 115 is electrically connected to a cathode collector of the cathode plate 112 that is not coated with the cathode active material. The anode tab 114 and the cathode tab 115 can be referred to as a first tab and a second tab, respectively. Voltage generated from the electrode assembly can be measured or determined between the anode tab 114 and the cathode tab 115. An insulation tape, in order to prevent short-circuit between the two electrode plates and electrode tabs, may be formed around the border regions where the anode tab 114 and the cathode tab 115 are drawn out from the electrode assembly 110. In addition, the width of the separator 113 may be formed wider than those of the anode plate 111 and the cathode plate 112 so as to prevent short-circuit between the electrode plates.

On the other hand, an insulation case 140 may be formed on the upper surface of the electrode assembly 110 so as to prevent short-circuit between the electrode assembly 110 and the cap assembly 130, and to cover the upper end of the electrode assembly 110. The insulation case 140 is formed of polymer resin having an insulation property. In addition, a hole is formed in a central part of the insulation case 140 so that the cathode tab 115 can pass through the hole, and an electrolytic solution through-hole 141 is formed on the insulation case.

The can 120 is formed of aluminum or aluminum alloy, and is formed approximately in a parallelepiped rectangular shape, and receives the electrode assembly 110 through an opening of the top surface of the can 120. The can 120 stores the electrode assembly 110 and an electrolytic solution. In addition, the can 120 itself can function as a electrode terminal.

The cap assembly 130 includes a flat plate shaped cap plate 132 having a size and a shape that corresponds to the opening of the top surface of the can 120. A terminal hole 132a is formed in a central part of the cap plate 132, and a tube-shaped gasket 133 is formed between the electrode terminal passing through the terminal hole 132a and the cap plate 132 for electrical insulation. An insulation plate 134 is placed on the lower surface of the cap plate 132, and a terminal plate 135 is placed on the lower surface of the insulation plate 134. The bottom part of the electrode terminal 131 is electrically connected to the terminal plate 135. The anode tab 114 drawn out from the anode plate 111 is welded to the lower surface of the cap plate 132, and the cathode tab 115 drawn out from the cathode plate 112 is welded to the lower surface of the electrode terminal 131.

An electrolytic solution injection hole 132b is formed on the cap plate 132, and a cap 132c is placed on the solution injection hole 132b to seal the electrolytic solution injection hole 132b after the injection of the electrolytic solution. The ball type cap 132c is made of a material such as aluminum or aluminum-containing metal, and is placed on the electrolytic solution injection hole 132b and mechanically blocks the electrolytic solution injection hole 132b. In addition, the cap 132c can be welded to the cap plate 132 around the electrolytic solution injection hole 132b. A safety vent 132d is formed on the other side of the cap plate 132. The safety vent 132d is broken, if the internal pressure of the battery rises over a predetermined level, to prevent an ignition or an explosion of the battery.

Referring to FIGS. 2 to 5, a flat plate 150 is attached to the cap plate 132 to connect the cap plate 132 to the lead plate 300. The flat plate 150 is composed of two or more metal layers. The flat plate 150 is formed as a clad metal layer formed of different metals. The clad metal layer can be formed by welding two or more metals having different properties through a process such as a hot rolling, a cold rolling or an explosive welding.

In addition, the flat plate 150 includes an upper metal layer 151 formed of a nickel metal layer coupled to the lead plate 300 and a lower metal layer 152 formed of an aluminum metal layer coupled to the cap plate 132. Accordingly, if the lead plate 300 is formed of the same material as the upper metal layer 151, the lead plate 300 can be easily welded to the upper metal layer 151 of the flat plate 150, and if the cap plate 132 is formed of the same material as the lower metal layer 152, the cap plate 132 can be easily welded to the lower metal layer 152 of the flat plate 150. In addition, the corresponding welding of the flat plate 150, the lead plate 300 and the cap plate 132 is a welding of metals with same materials, and thus the adhesive strength is also enhanced.

The protective circuit board 200 is formed in a shape of a plate having the same or similar size and shape as those of the cap plate 132, and includes a protective circuit to enhance safety of the battery by preventing an over-charge or over-discharge of the battery. In addition, external terminals 210 coupled to an external device are provided on the protective circuit board 200. The protective circuit formed on the protective circuit board 200 and each of the external terminals 210 are electrically connected by a conductive structure that passes through the protective circuit board 200.

Figure 3A:
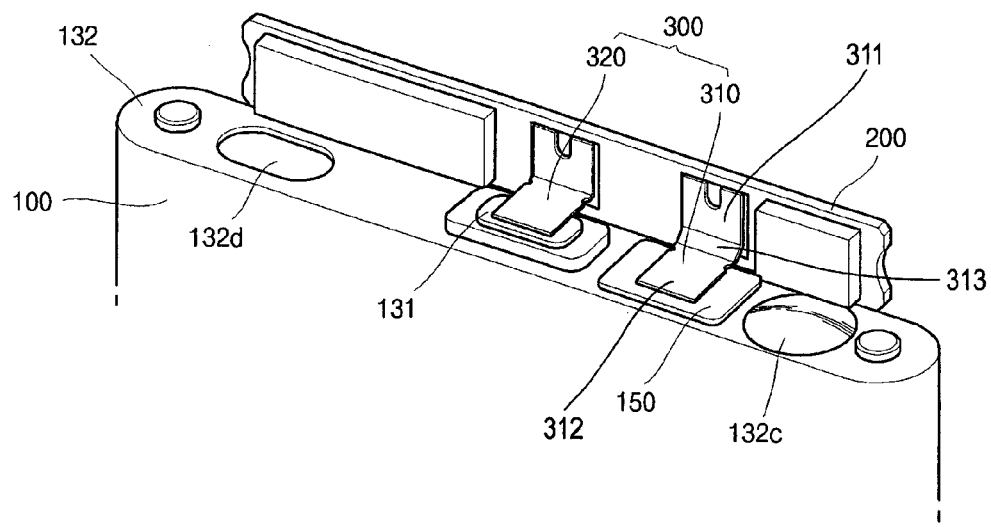
FIGS. 3a and 3b are diagrams illustrating open and closed shapes of a protective circuit board and a bare cell according to one embodiment of the present invention.
Figure 3B:
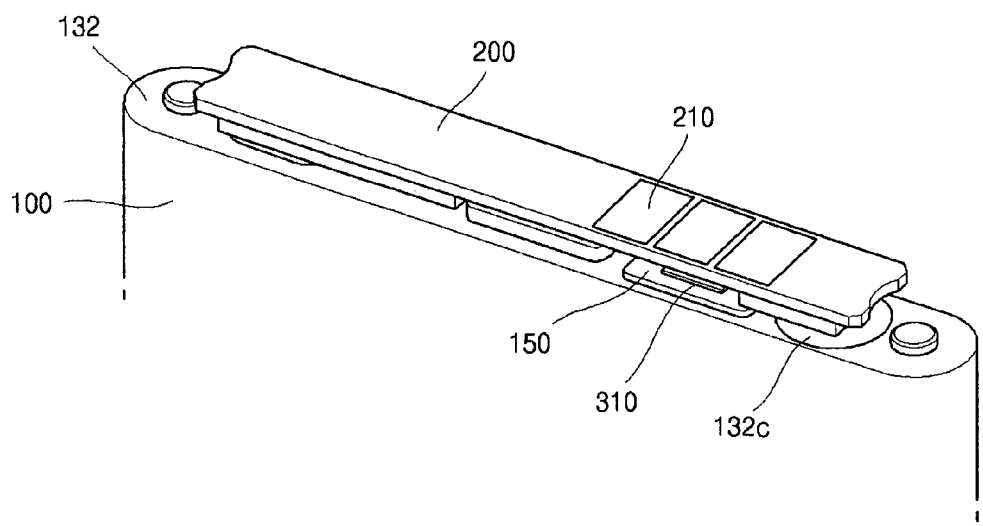

The lead plate 300, as shown in FIG. 3a, is coupled to the bare cell 100 at its one side and coupled to the protective circuit board 200 at its other side. The lead plate 300 includes an anode lead plate 310 (a first lead plate) and a cathode lead plate 320 (a second lead plate). The lead plate 300 (the first lead plate 310 or the second lead plate 320) has a first plate 311, a second plate 312, and a pivot portion 313. As shown in FIGS. 3a and 3b, the first plate 311 is coupled to the protective circuit board 200, and the second plate 312 is coupled to the cap plate 132. The first plate 311 and the second plate 312 are connected through the pivot portion 313. The lead plate 300 can be bent or folded about the pivot portion 313. The lead plate 300 mechanically hold the circuit board 200 in a position closer to the cap plate 132, and make the protective circuit board 200 arranged parallel to the cap plate 132.

In one example, as shown in FIG. 3a, the first lead plate 310 and the second lead plate 320, both of which are coupled to the protective circuit board 200, are coupled to the electrode terminal 131 and the flat plate 150, respectively. As shown in FIG. 3b, if the lead plate 300 is folded about the pivot portion 313 (by rotating the first plate 311 by 180 degrees about the pivot portion 11313), the protective circuit board 200 is pulled down to the cap plate 132, and make the protective circuit board 200 arranged parallel to the cap plate 132. In this position, the first plate 311 of the lead plate faces the second plate 312 of the lead plate, and the protective circuit board 200 and the bare cell 100 is closed packed. Accordingly, the space between the bare cell 100 and the protective circuit board 200 is prominently reduced, which improves the capacity per volume of the battery.

Figure 4:
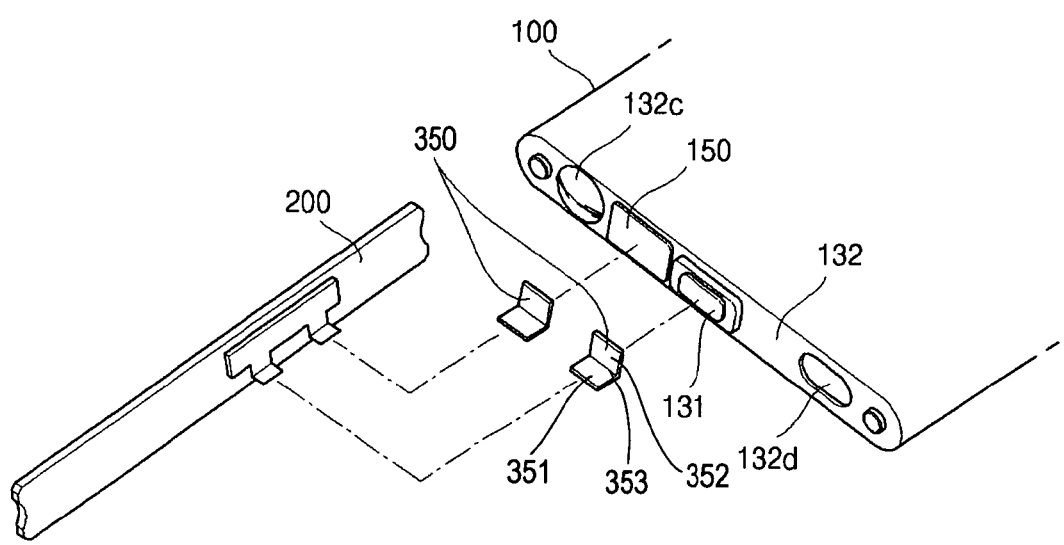
FIG. 4 is a diagram illustrating a L-shaped lead plate that couples the protective circuit board to the bare cell, which is constructed as another embodiment of the present invention.

In another example, referring to FIG. 4, the lead plate 350 is formed in L-shape. The lead plate 350 has a first plate 351, a second plate 352, and a pivot portion 353. The first plate 351 is coupled to the protective circuit board 200, and the second plate 352 is coupled to the cap plate 132. In this case, the lead plate 350 is bent by about 90 degrees about the pivot portion 353. In other words, the first plate 351 is arranged substantially perpendicular to the second plate 352.

As described above, the flat plate may have a lower metal layer and an upper metal layer. The lower metal layer of the flat plate is coupled to the cap plate. The lower metal layer may be welded to the cap plate by laser welding or ultrasonic wave welding. One of the lead plates may be coupled to the upper metal layer of the flat plate by the resistance weld.

Figure 7:
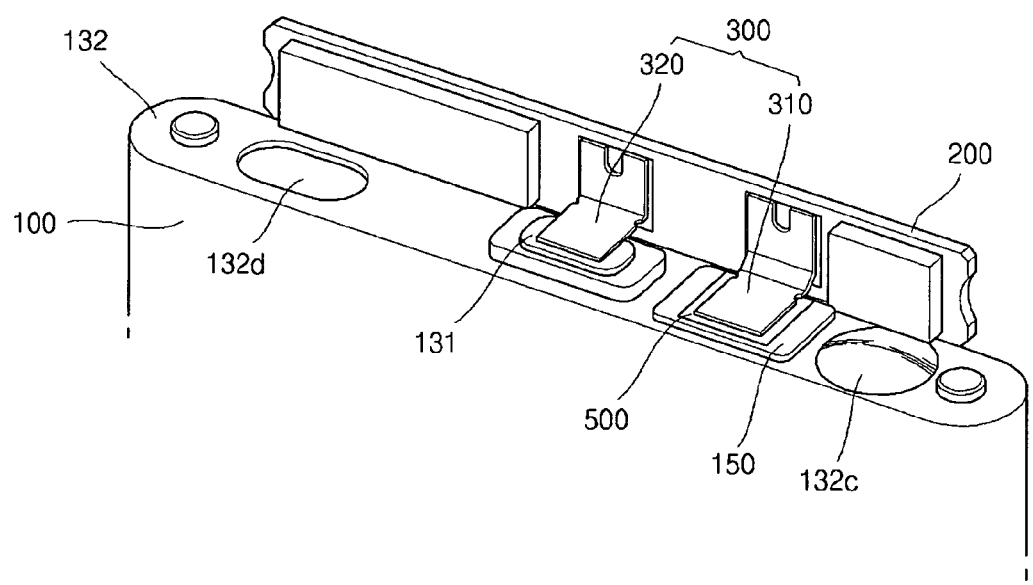
FIG. 7 is a diagram illustrating an open position of a protective circuit board that is coupled to a bare cell of another embodiment of the present invention.

Referring to FIG. 7, the protective circuit board 200 is coupled to one side of the cathode lead plate 320, and the electrode terminal 131 of the bare cell 100 is coupled to the other side of the cathode lead plate 320. The protective circuit board 200 is also coupled to one side of the anode lead plate 310 and the flat plate 150 is coupled to another side of the anode lead plate 310. In this case, however, a safety device 500 is formed between the flat plate 150 and the another side of the anode lead plate 310. In other words, the anode lead plate 310 is coupled to the flat plate 150 through the safety device 500.

The safety device 500 is installed to protect the over-current, over-charge, and over-discharge of the rechargeable battery. A fuse, a bimetal, a positive temperature coefficient (PTC) element etc. may be used for the safety device 500. The safety device 500 can be the PTC element that quickly blocks the flow of the current when the temperature rises over a predetermined level, and quickly recovers the flow of the current when the temperature remains in the range again.

As shown in FIG. 1 and FIG. 2, a combining case 400 covers the protective circuit board 200, and is coupled to an upper portion of the bare cell 100. The combining case 400 has a shape of a container that has a space inside. The protective circuit board 200 is disposed inside the space of the combining case 400, and whenever the combining case 400 is coupled to the bare cell 100, the protective circuit board 200 is enclosed by the combining case 400 and the top surface of the bare cell 100. The combing case 400 can be an injection molded case or container.

The combining case 400, having a shape of a container, has an opening on one surface. The opening of the combining case 400 has a sleeve 420, which forms a protruded surface along the edge of the opening. Whenever the combining case 400 is coupled to the bare cell, the sleeve 420 is coupled to the upper end of the bare cell 100 in a manner that the sleeve 420 surrounds the circumference of the top surface of the bare cell 100. Accordingly, the upper end of the bare cell 100 is covered by the sleeve of the combining case 400. The sleeve 420 improves the security and the safety of the battery.

The sleeve 420 of the combining case 400 may be bonded to the bare cell to prevent the combining case 400 from being separated from the upper end of the bare cell 100. The bonding of the sleeve 420 and bare cell 100 will enhance the adhesive strength between the combining case 400 and the bare cell 100. The adhesive strength between the combining case 400 and the bare cell 100 can be enhanced by wrapping a tape around the circumference of the coupled region of the combining case 400 and the bare cell 100.

An external terminal hole 410 is formed on the combining case 400 so that the external terminal 210 formed on the protective circuit board 200 can be exposed to the outside of the combining case 400 to be coupled to an external device. The external terminal hole 410 is formed on a surface of the combining case 400 that is opposite side from the opening of the combining case 400. The location and size of the external terminal hole 410 is arranged to correspond to those of the external terminal 210.

On the other hand, the battery may be built by rigidly combining the bare cell 100, the protective circuit board 200 and other accessories of the battery in a melting method using a molding resin instead of the combining case 400.

Hereinafter, a manufacturing process of the rechargeable battery of the embodiment of the invention, which has the features described above, will be briefly explained.

The bare cell 100, as shown in FIGS. 3a and 3b, is electrically coupled to the protective circuit board 200 through the lead plate 300. In order to couple the protective circuit board 200 to the cap plate 132 of the bare cell 100, a flat plate 150 of the clad metal layer is prepared, and is formed on the cap plate 132.

The flat plate 150, as shown in FIG. 5, is formed of an upper metal layer 151 made of nickel and a lower metal layer 152 made of aluminum. The lower metal layer 152 of the flat plate 150 is first welded to the cap plate 132 made of aluminum. Next, the anode lead plate 310 made of nickel is welded to the upper metal layer 151 of the flat plate 150. In other words, the anode lead plate 310 is made of the same material as the upper metal layer 151 of the flat plate 150, and the cap plate 132 is made of the same material as the lower metal layer 152 in order to increase the efficiency of the welding process and to enhance the adhesive strength. In one embodiment, however, a safety device 500 can be formed between the upper metal layer 151 and the anode lead plate 310.

One side of the cathode lead plate 320 is coupled to the electrode terminal 131 of the bare cell 100, while one side of the anode lead plate 310 is being coupled to the flat plate 150. Then, another sides of the cathode lead plate 320 and the anode lead plate 310 are coupled to the protective circuit board 200. In this stage, the protective circuit board 200 and the bare cell 100 are electrically and mechanically coupled to each other, but are in an open position as shown in FIG. 3a.

As described above, a lead plate has a pivot portion, about which the lead plate can be folded or bent. The protective circuit board 200 can be more compactly packed by holding the protective circuit board 200 down to the cap plate 132 of the bare cell 100. The anode lead plate 310 and the cathode lead plate 320 are completely folded about their pivot portions, and the protective circuit board 200 is closely arranged on the top of the cap plate 132. Therefore, the volume of the space between the protective circuit board 200 and the cap plate 132 is dramatically reduced, and the overall size of the battery is prominently reduced, improving the capacity per volume of the battery.

Next, the combining case 400, as shown in FIGS. 1 and 2, is coupled to the bare cell 100. The top surface of the bare cell 100, on which the protective circuit board 200 is installed, is inserted into the sleeve 420 of the combining case 400. Therefore, the combining case encloses the top surface of the bare cell 100 as well as the protective circuit board 200. The position of the external terminal hole 410 is designed to be matched with the position of the external terminal 210 of the protective circuit board 200. Therefore, whenever the top surface of the bare cell 100, on which the protective circuit board 200 is installed, is inserted into the sleeve 420 of the combining case 400, the external terminal 210 is exposed through the external terminal hole 410, and can be coupled to an external device.

The rechargeable battery of the present invention has the following advantages. First, the lead plate is not directly combined with the cap plate, in which the cap plate is made of material different from the lead plate, and the lead plate and cap plate are respectively welded to the metal layer made of the same material by means of the flat plate formed of metals that are different from each other, thereby allowing them to be easily combined with each other and the adhesive force to be enhanced.

Second, the protective circuit board is located in parallel with the bare cell 100 using the lead plate so as to reduce prominently the distance spaced between them, thereby allowing the capacity per volume of the battery to be increased.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A rechargeable battery comprising:
 a bare cell for producing electricity, the bare cell comprising a first tab and a second tab, voltage of the battery being determined between the first and second tabs, the bare cell including a cap plate that is coupled to the first tab, and an electrode terminal that is coupled to the second tab, the cap plate including an electrolytic solution injection hole sealed by a cap;

a protective circuit board;

a first lead plate electrically coupled to each of the bare cell and the protective circuit board; and a flat plate formed on the cap plate of the bare cell, the flat plate comprising at least two metal layers, the flat plate coupled to the first lead plate, the flat plate being positioned between the electrode terminal and the cap, and an entire surface of the flat plate being in contact with the cap plate, the flat plate not covering the cap.

2. The rechargeable battery of claim 1, wherein the flat plate comprises an upper metal layer coupled to the first lead plate and a lower metal layer coupled to the cap plate, the upper metal layer formed of a material including nickel and the lower metal layer formed of a material including aluminum.

3. The rechargeable battery of claim 1, wherein the protective circuit board is arranged substantially parallel to the cap plate.

4. The rechargeable battery of claim 3, wherein the first lead plate comprises a first plate, a second plate and a pivot portion connecting the first plate to the second plate, the first plate being coupled to the protective circuit board and the second plate being coupled to the bare cell, the first lead plate being folded about the pivot portion in a manner that the first plate faces the second plate.

5. The rechargeable battery of claim 4, further comprising a second lead plate, one side of the second lead plate being coupled to the protective circuit board and another side of the second lead plate being coupled to the electrode terminal of the bare cell.

6. The rechargeable battery of claim 3, wherein the first lead plate comprises a first plate, a second plate and a pivot portion connecting the first plate to the second plate, the first plate being coupled to the protective circuit board and the second plate being coupled to the bare cell, the first lead plate being bent about the pivot portion in a manner that the first plate is substantially perpendicular to the second plate.

7. The rechargeable battery of claim 1, further comprising a combining case covering the cap plate of the bare cell, the protective circuit board, and the first lead plate.

8. The rechargeable battery of claim 7, wherein the combining case has a sleeve, the combining case being coupled to the bare cell through the sleeve.

9. The rechargeable battery of claim 8, wherein the combining case includes an injection molded case having a space inside thereof.

10. The rechargeable battery of claim 8, wherein the combining case comprises an external terminal hole for exposing an external terminal of the protective circuit board through the combining case.

11. The rechargeable battery of claim 8, wherein the sleeve of the combining case is bonded to the bare cell.

12. The rechargeable battery of claim 8, further comprising a tape wrapping the coupled region of the bare cell with the sleeve of the combining case.

13. The rechargeable battery of claim 1, further comprising a safety device formed between the flat plate and the first lead plate, the safety device protecting malfunction of the battery.

14. The rechargeable battery of claim 13, wherein the safety device comprises a positive temperature coefficient (PTC) element.

15. The rechargeable battery of claim 1, wherein the flat plate comprises a clad metal.

16. A rechargeable battery comprising:

a bare cell for producing electricity, the bare cell comprising a first tab and a second tab, voltage of the battery being determined between the first and second tabs, the bare cell including a cap plate that is coupled to the first tab, and an electrode terminal that is coupled to the second tab, the cap plate including an electrolytic solution injection hole sealed by a cap;

a protective circuit board;

a first lead plate electrically coupled to each of the bare cell and the protective circuit board; and a flat plate formed on the cap plate of the bare cell, the flat plate including an upper metal layer coupled to the first lead plate and a lower metal layer coupled to the cap plate, the upper metal layer and the lower metal layer being made of different materials, the flat plate being positioned between the electrode terminal and the cap, and an entire surface of the flat plate being in contact with the cap plate, the flat plate not covering the cap.

17. The rechargeable battery of claim 16, wherein the cap plate is made of the same material as the lower metal layer of the flat plate, and the first lead plate is made of the same material as the upper metal layer of the flat plate.

18. The rechargeable battery of claim 16, wherein the first lead plate comprises a first plate, a second plate and a pivot portion connecting the first plate to the second plate, the first plate being coupled to the protective circuit board and the second plate being coupled to the bare cell, the first lead plate being folded about the pivot portion in a manner that the first plate faces the second plate.

19. The rechargeable battery of claim 18, further comprising a second lead plate, one side of the second lead plate being coupled to the protective circuit board and another side of the second lead plate being coupled to the electrode terminal of the bare cell.

* * * * *